United States Patent [19]

Iwatsuki

[11] 4,147,177
[45] Apr. 3, 1979

[54] FLOW REGULATOR

[75] Inventor: Frank Iwatsuki, Evanston, Ill.

[73] Assignee: Gould Inc., Rolling Meadows, Ill.

[21] Appl. No.: 809,605

[22] Filed: Jun. 24, 1977

Related U.S. Application Data

[63] Continuation of Ser. No. 624,556, Oct. 21, 1975, Pat. No. 4,051,864.

[51] Int. Cl.² ............................................. G05D 7/01
[52] U.S. Cl. .................................................... 137/504
[58] Field of Search ........................................ 137/504

[56] References Cited

U.S. PATENT DOCUMENTS

| | | | |
|---|---|---|---|
| 2,807,279 | 9/1957 | Presnell | 137/504 X |
| 3,424,196 | 1/1969 | Donner | 137/504 |

*Primary Examiner*—Robert G. Nilson
*Attorney, Agent, or Firm*—Wegner, Stellman, McCord, Wiles & Wood

[57] ABSTRACT

A flow regulator for controlling fluid flow in regulating the operation of a fluid controlled device, such as a fork truck lift mechanism. The regulator provides a damping effect similar to that provided by a fixed orifice while concurrently providing such effect at constant speed so as to maintain the flow rate notwithstanding changes in load conditions. The flow regulator includes an improved flow stabilizing device in association with a sensing orifice structure for improved sensitivity in the response of the flow regulator to changes in pressure. The flow regulator further includes dashpot structure for damping the flow regulator piston movement both inwardly and outwardly in the flow regulating operation of the device.

11 Claims, 18 Drawing Figures

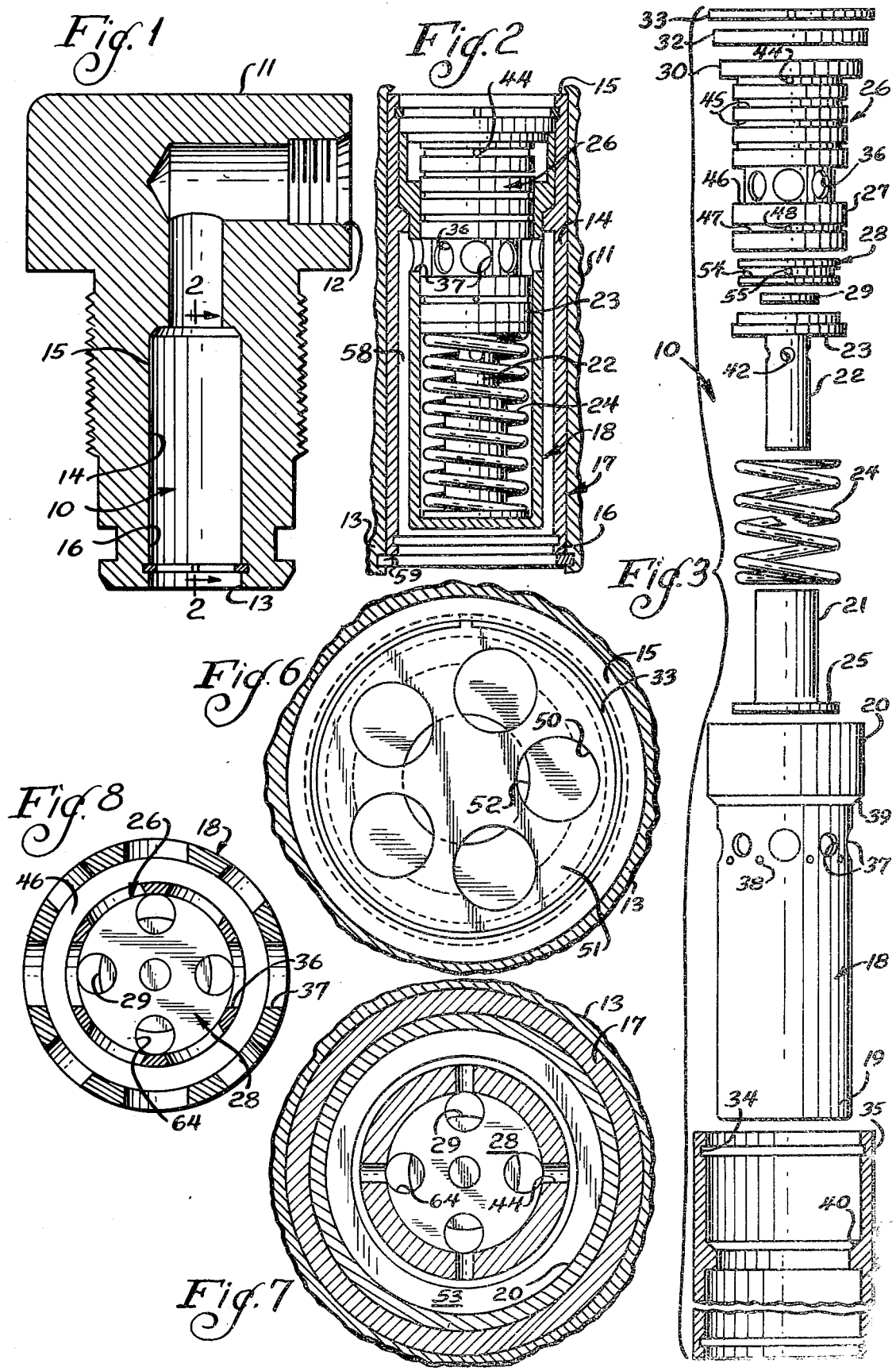

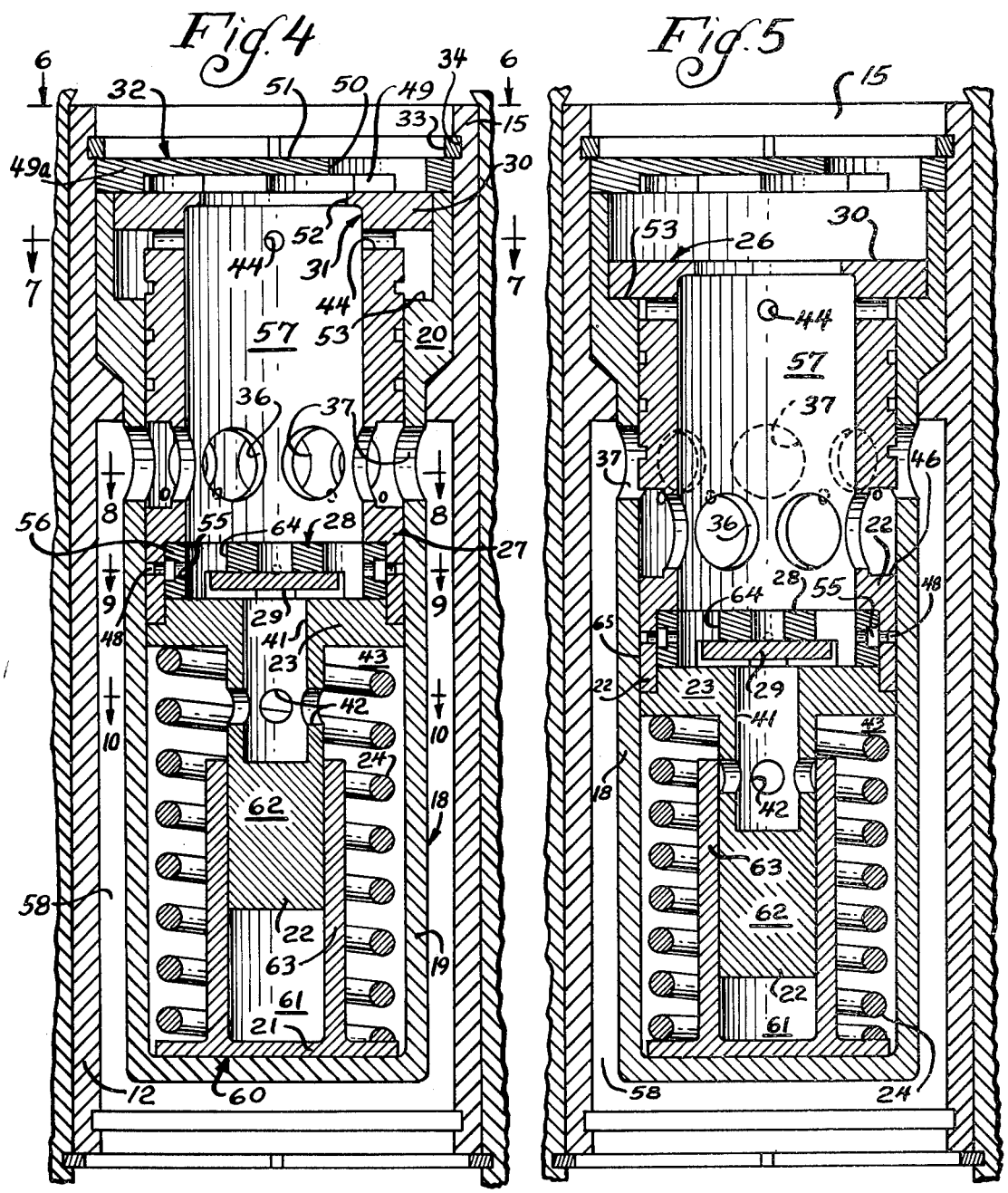

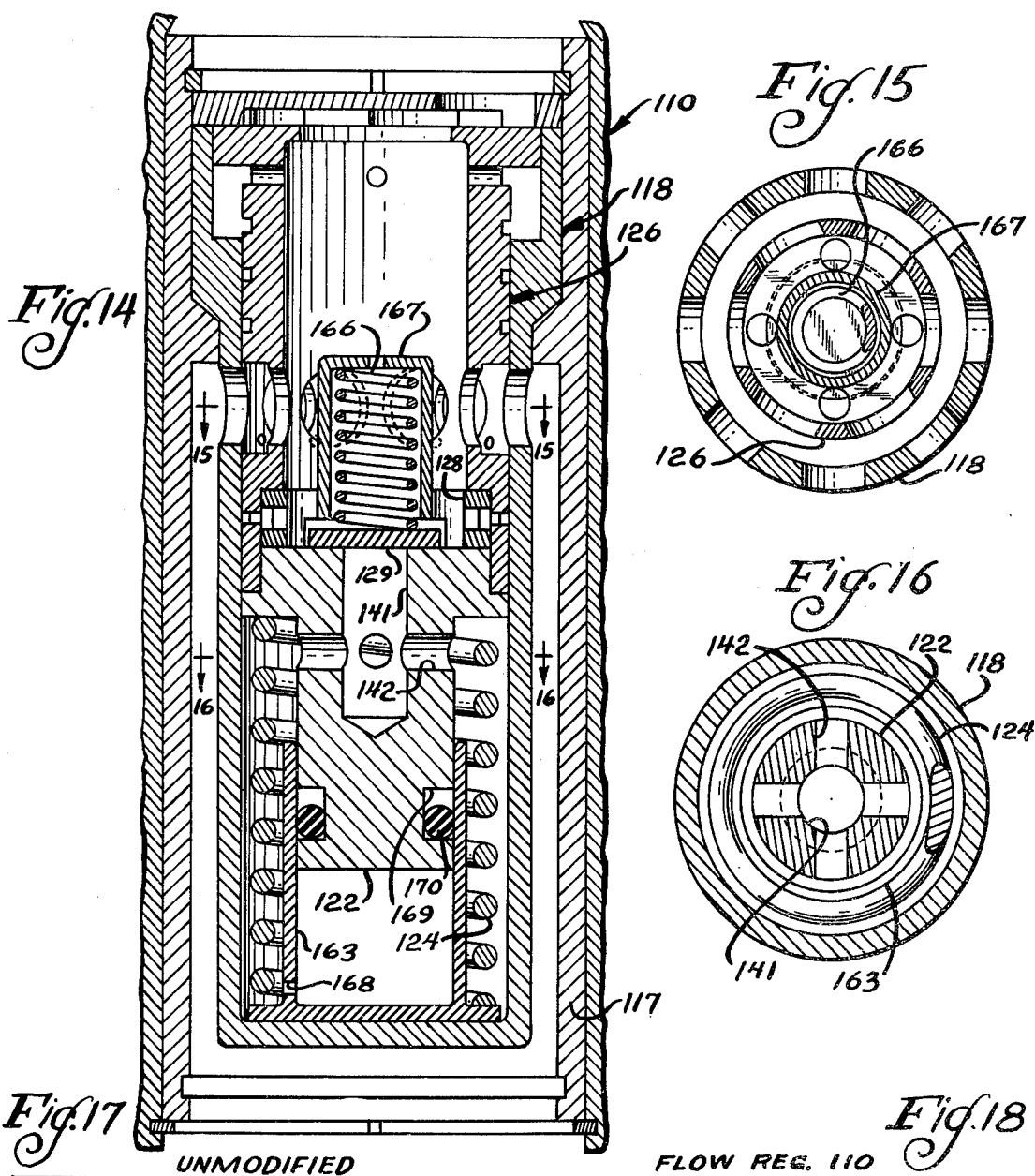

FLOW REGULATOR

CROSS-REFERENCE TO RELATED APPLICATION

This application comprises a continuation of my copending application Ser. No. 624,556, filed Oct. 21, 1975, entitled "Flow Regulator", now U.S. Pat. No. 4,051,864.

BACKGROUND OF THE INVENTION

1. Field of the Invention

This invention relates to flow regulators and in particular to flow regulators for use in fluid systems having widely and rapidly varying pressure conditions.

2. Description of the Prior Art

In the operation of the lift mechanism of a fork lift truck, fluid systems are utilized which are adapted to rapidly raise and lower the lift means both under relatively heavy and light loads. A problem has arisen in the known fluid controls wherein chattering, overshooting, variable travel rate, and other similar undesirable operation occurs. The problem is aggravated by the relatively wide range of pressure conditions obtaining in such systems in the operation of the lifting mechanism wherein, for example, pressures may vary over the range of approximately 0 to 4000 p.s.i. drop in the regulating system.

In addition, oscillations in the pressure may occur which typically may have a frequency of approximately two oscillations per second, tending to further aggravate the control problem.

One form of flow regulator for use in such applications utilizes a fixed orifice which provides for damping of the oscillations but does not provide such damping at constant speed. Rather, such fixed orifice flow regulators cause a variation in the flow rate with the load thus presenting a serious problem in the accurate control of the load in such fork lift truck applications.

In the fixed orifice flow regulators, sudden pressure changes permit a damped oscillation which may have original substantial excursions causing a chattering effect. Where piston-type flow regulators are utilized, the pressure variation excursions may continue for a substantial period of time presenting a serious chattering problem.

SUMMARY OF THE INVENTION

The present invention comprehends an improved flow regulator for use in fluid systems having a wide range of pressures and rapid pressure changes, such as in fork lift truck hydraulic mechanisms.

The present flow regulator provides a damping effect similar to that of a fixed orifice while yet providing a constant flow rate for improved stabilization of the load in the raising and lowering operations. The present regulator provides such constant flow rate over a wide range of applied pressures, as found in such fork lift truck mechanism.

The flow regulator of the present invention includes improved flow stabilizing means for improved operation of a sensing orifice provided in the control piston whereby improved accurate and sensitive control of the hydraulic fluid is provided. The sensing orifice is relatively large in diameter and, thus, functions solely to control the size of the outlet ports from the piston to the outlet of the regulator in regulating the fluid flow.

The regulator of the present invention further includes improved damping means for effectively minimizing the excursions of the regulator upon sudden changes in the applied fluid pressure as occur in the normal operation of fork lift trucks and the like. The damping means in the present regulator comprises dashpot means, and in the illustrated embodiment, a pair of dashpot means is provided for improved damping functioning. The dashpot structures are arranged coaxially of the piston so as to effectively prevent lockup of the piston, as has occurred in flow regulators of the prior art, wherein asymmetrical application of pressure forces has been used to cause a frictional damping of the piston movement.

The dashpot means of the present invention provide an improved damping functioning and are preferably relatively large so as to minimize criticality of clearances in the dashpot structures.

The invention further comprehends the provision of means for preventing undesirable pressure differentials to be applied to the piston by the exhausting fluid passed to the outlet. Thus, low pressure conditions at the inner end of the piston, which may be caused by venturi action at the outlet ports, are effectively precluded to assure accurate control of the regulator by the sensing orifice.

The stabilizing means may comprise an apertured disc upstream of the sensing orifice arranged to cause the viscosity of the fluid to have minimal effect in the operation of the sensing orifice. Resultingly, the single relatively large opening of the sensing orifice functions in the manner of a knife edge opening providing improved distribution of pressure on the piston face for improved flow regulation. The stabilizing disc may be removably associated with the regulator, permitting any one of a plurality of different such discs to be used for selectively changing the flow rate of the regulator, as desired.

The outlet ports of the piston are arranged to be maintained at least partially open at all times to prevent complete stoppage of the fluid flow and thereby provide further improved smooth operation of the flow regulator.

The dashpot means may be arranged in series relationship to provide a fail-safe functioning as well as improved damping control of the regulator in the normal operation thereof.

Thus, the flow regulator of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a diametric section of a portion of a fork lift truck hydraulic mechanism housing provided with a flow regulator embodying the invention;

FIG. 2 is a diametric section of the flow regulator;

FIG. 3 is an enlarged exploded elevation thereof;

FIG. 4 is an enlarged diametric section illustrating the arrangement of the flow regulator with minimum pressure differential thereacross;

FIG. 5 is an enlarged diametric section illustrating the arrangement of the flow regulator with maximum pressure differential thereacross;

FIG. 6 is a transverse section taken substantially along the line 6—6 of FIG. 4;

FIG. 7 is a transverse section taken substantially along the line 7—7 of FIG. 4;

FIG. 8 is a transverse section taken substantially along the line 8—8 of FIG. 4;

FIG. 9 is a transverse section taken substantially along the line 9—9 of FIG. 4;

FIG. 10 is a transverse section taken substantially along the line 10—10 of FIG. 4;

FIG. 14 is an enlarged diametric section illustrating the arrangement of a modified form of flow regulator with minimum pressure differential thereacross;

FIG. 15 is a transverse section taken substantially along the line 15—15 of FIG. 14;

FIG. 16 is a transverse section taken substantially along the line 16—16 of FIG. 14;

FIG. 17 is a graph illustrating the pressure variation upon a sudden change in the load conditions provided by the flow regulator of FIG. 14 without the spring means for biasing the check valve and the outlet aperture in the lower dashpot; and FIG. 18 is a graph illustrating the pressure variation upon a sudden change in the load conditions provided by the flow regulator of FIG. 14.

DESCRIPTION OF THE PREFERRED EMBODIMENTS

Figure 11:
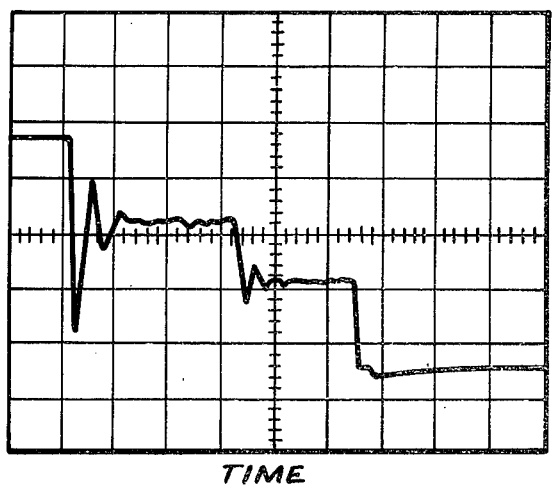
FIG. 11 is a graph illustrating the pressure variation upon a sudden change in the load conditions provided by the flow regulator of the present invention.

In the exemplary embodiment of the invention as disclosed in FIGS. 1-13 of the drawing, a flow regulator generally designated 10 is provided for regulating fluid flow in fluid systems having a wide range and sudden changes in fluid conditions thereof. In the illustrated embodiment, the flow regulator is installed in a housing 11 of a fork lift truck for controlling fluid flow between an inlet 12 and an outlet 13 thereof. Conventionally, the fluid utilized in such truck lifting mechanishm is hydrualic fluid and is subject to wide and sudden changes in pressure in the operation of the truck, such as in the range of from 0 to 4000 p.s.i., substantially instantaneously. The flow regulator may be received in a chamber 14 disposed intermediate the inlet 12 and outlet 13 and defines an inlet end portion 15 and an outlet end portion 16.

As best seen in FIG. 3, the flow regulator includes a tubular shell 17 coaxially receiving a piston sleeve 18. The piston sleeve defines a closed inner end portion 19 and an open outer end portion 20.

A cup-shaped dashpot housing 21 is received in the inner end 19 of the piston sleeve 18 and slidably receives a cylindrical dashpot plunger 22 provided at its outer end with a head 23. The dashpot plunger is urged axially outwardly by a helical spring 24 extending between a spring retainer flange 25 on the inner end of the dashpot housing and the head 23 of the dashpot plunger. A piston 26 is slidably received in the outer end 20 of the sleeve and is provided with an inner end 27 receiving a check valve body 28 in which is movably received a check valve disc 29.

The outer end 30 of the piston defines an axial sensing orifice 31 (FIG. 4). A stabilizing disc 32 is disposed outwardly of the piston end 30 for stabilizing flow of hydraulic fluid through sensing orifice 31. Disc 32 may comprise any one of a plurality of stabilizing disc elements having different flow capacities for selectively controlling the flow rate of the regulator.

A split retaining ring 33 may be provided for retaining the elements of the flow regulator within the shell 17 by the removable reception of the ring 33 in an annular groove 34 in the outer end 35 of the shell.

Piston 26 is provided adjacent inner end 27 with a plurality of radial ports 36 adapted to pass the hydraulic fluid outwardly through a corresponding plurality of ports 37 in piston sleeve 18 adjacent outer end 20. A plurality of small pressure relief ports 38 may be provided in piston sleeve 18 inwardly adjacent ports 37.

Inward movement of piston sleeve 18 through shell 17 is limited by a shoulder 39 at the inner end of piston sleeve portion 20 abutting an outwardly facing shoulder 40 at the inner end of shell portion 35.

Dashpot plunger head 23 is provided with an axial passage 41 extending partially into plunger portion 22, as shown in FIG. 4. A plurality of radial ports 42 are provided opening outwardly from passage 41 into dashpot chamber 43 defined by the inner end 19 of piston sleeve 18.

A plurality of pressure relief ports 44 are provided in piston 26 inwardly of outer end 30, and a plurality of annular grooves 45 are provided in the piston between outer end 30 and ports 36.

The piston defines an annular channel 46 through which ports 36 open. A groove 47 is provided in the inner end 27 of the piston through which opens a plurality of radial pressure relief ports 48.

Stabilizing disc 32 defines an inwardly opening cylindrical axial recess 49 and a plurality of longitudinally opening ports 50 spaced concentrically about the center portion 51 of the disc. Thus, the stabilizing disc element effectively comprises a perforate disc having an annular turned flange 49a defining stop means for limiting the movement of the piston toward the inlet. As best seen in FIGS. 4 and 6, the radially inner portion of the ports 50 is axially aligned with the outer edge 52 of the sensing orifice 31.

As further shown in FIG. 4, the piston sleeve outer portion 20 further defines an inner annular radial shoulder 53 which, as shown in FIG. 5, limits the inward movement of piston 26 by the abutment of outer end 30 therewith at the extreme innermost position of the piston in the piston sleeve.

Check valve body 28 is provided with an outer annular groove 54 and a plurality of radial ports 55 opening outwardly through an annular edge portion 56 thereof to a corresponding plurality of ports 48 of piston 26.

The operation of the flow regulator is extremely simple. Hydraulic fluid may flow inwardly through inlet end portion 15 of the regulator through the ports 50 of the stabilizing disc 32. The fluid then flows through the recess 49 generally radially and angularly inwardly to sensing orifice 52 and into the hollow interior 57 of the piston. Ports 44 equalize the pressure radially outwardly of the piston axially outwardly of shoulder 53.

The pressure differential acting across orifice 52 causes the piston to move in piston sleeve 18, thereby adjustably positioning the piston ports 36 relative to the piston sleeve ports 37 and maintaining a constant flow rate of the hydraulic fluid through the regulator.

The piston is biased outwardly by the coil spring 24 which acts against dashpot plunger head 23 and, in turn, against the inner end 27 of the piston. Thus, the piston is selectively adjusted by the joint action of the fluid pressure differential across the sensing orifice 31 and the force of spring 24.

The stabilizing disc 32 limits the outward movement of the piston by the engagement of the disc with retainer 33. Retainer 33 comprises a removably split retainer permitting the substitution of any one of a plurality of different stabilizing discs having different size ports 50 to provide any one of a different number of flow rates in the regulator, as desired.

As seen in FIG. 2, the hydraulic fluid leaving port 37 may flow through the annular space 58 to the outlet end portion 16 of the flow regulator. The flow regulator may be retained in outlet end 13 of housing 11 by a removable retaining ring 59.

The operation of flow regulator 10 is damped by a plurality of dashpot means. A first dashpot means generally designated 60 is defined by the dashpot housing 21 and dashpot plunger 22. As seen in FIG. 4, inward movement of the piston urges the dashpot plunger head 23 downwardly to correspondingly urge the dashpot plunger 22 into the dashpot chamber 61 of the housing 21. As hydraulic fluid is contained in chamber 61, this downward movement is resisted by the fluid which may escape from chamber 61 solely through the clearance space 62 between plunger 22 and housing wall 63. The fluid escaping therefrom flows into chamber 43 and is conducted therefrom through ports 42 and dashpot passage 41 through a plurality of ports 64 in check valve body 28 to the piston chamber 57 for flow outwardly therefrom through ports 36 and 37. When the piston is moving downwardly, as seen in FIG. 4, the check valve disc 29 is raised by the upwardly moving fluid escaping from chamber 43 to permit this flow to the outlet ports 36 and 37.

This action may continue until the piston moves downwardly to the position of FIG. 5 wherein the ports 42 are fully received within the dashpot housing wall 63, whereupon flow of fluid outwardly from chamber 43 through ports 42 is substantially restricted. Further downward movement of the piston 26 is now primarily accommodated by the flow of fluid from chamber 43 through the clearance space 65 between dashpot head 23 and piston end 27, and piston sleeve 18, permitting this escaping fluid to be discharged through ports 36 and 37 to the discharge chamber 58. Concurrently, fluid in chamber 61 displaced by the continuing downward movement of the dashpot plunger 22 passes through the clearance space 62 to the ports 42 to be discharged through the check valve ports 64 to the outlet ports 36 and 37.

Thus, during this phase of the operation of the flow regulator, the entrapped fluid is discharged through two dashpot clearance spaces in parallel to the outlet ports. As indicated above, the downward movement of the piston is limited by the engagement of piston end 30 with shoulder 53 to limit the flow regulator to a maximum inward disposition, as shown in FIG. 5. As seen therein, a small portion of the ports 36 remains overlying the inner portion of the ports 37 so that the outlet from piston chamber 57 remains open to the outlet of the flow regulator at all times.

The outward flow through ports 36 and 37 may tend to produce a low pressure condition thereat by the venturi action of the flowing hydraulic fluid. Such venturi action produces a decrease in the static pressure and, thus, would tend to provide a spurious retarding force on the piston if it were not for the provision of the vent ports 55 and 48 in the check valve body 28 and piston end 27, respectively. Thus, these ports provide fluid pressure to the clearance space 65 substantially equal to the fluid pressure in chamber 57, preventing the undesirable pressure drop caused by the flowing discharging fluid and assuring maximum accuracy in the flow regulation of the regulator.

Upon a reduction in the fluid pressure delivered to the regulator inlet 12, spring 24 urges the dashpot head 23 outwardly, urging dashpot plunger 22 outwardly in chamber 61 and moving piston 26 upwardly to cause ports 36 to more fully overlie ports 37 and thereby provide an effectively maintained constant flow rate to the outlet chamber 58. During such outward movement of the piston, the check valve disc 29 is caused to seat on the dashpot head 23, thereby preventing fluid flow outwardly through passage 41 and requiring that all replenishment fluid in chamber 43 and chamber 61 be delivered from chamber 57 through the clearance space 65. Outward movement of the plunger 22 is controlled by the clearance space 62, thereby providing further control in the permissible outward movement of the piston by the spring 24 at this time.

The use of the two dashpots provides a fail-safe functioning affording improved safety in the use of the hydraulic system, thereby providing further advantage in the use of the improved flow regulator hereof.

Figure 12:
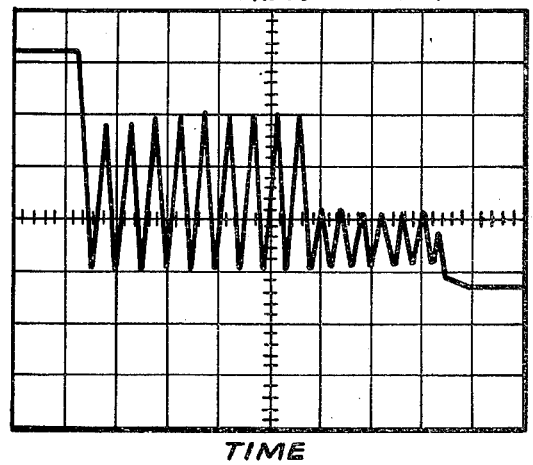
FIG. 12 is a graph illustrating the pressure variation upon a sudden change in the load conditions provided by a piston-type flow regulator of the prior art.
Figure 13:
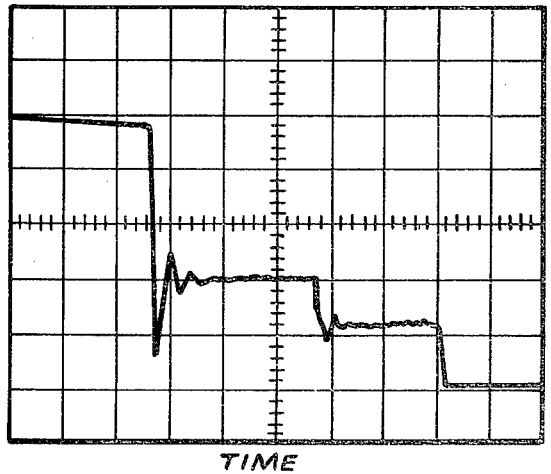
FIG. 13 is a graph illustrating the pressure variation upon a sudden change in the load conditions provided by a fixed orifice flow regulator of the prior art.

As best seen in FIGS. 11, 12 and 13, the functioning of flow regulator 10 provides a relatively small transient condition upon a sudden change in the pressure from a maximum to a minimum condition and effectively damps the oscillations so as to provide an improved constant flow rate regulation of the hydraulic fluid flow. This functioning is seen in FIG. 11 and may be compared with the functioning of a fixed orifice regulator, as shown in FIG. 13, and the prior art piston-type flow regulator illustrated in FIG. 12, not provided with the improved features of regulator 10.

In the illustrated embodiment of FIGS. 1–13, the radial clearance 62 may be in the range of approximately 0.0005" to 0.0010" and the radial clearance 65 may be in the range of 0.0015" to 0.00025". The outer diameter of the shell may be approximately 0.79" and the length thereof may be approximately 1.98". The diameter of the ports 50 in stabilizing disc 32 may be approximately 0.187" with five such ports being provided therein centered approximately 0.204" from the center of the disc. The sensing orifice effective diameter may be approximately 0.275" for a flow rate of approximately 13 gallons per minute, 0.295" for a flow rate of approximately 15 gallons per minute, and 0.315" for a flow rate of approximately 17 gallons per minute. The outlet ports 36 may have a diameter of approximately 0.140" and the outlet ports 37 may be similar thereto.

Referring now to FIGS. 14–18, a modified form of flow regulator generally designated 110 is shown to be similar to flow regulator 10 but provided with a helical spring 166 received in a spring retainer housing 167 attached to check valve body 128. Spring 166 biases the check valve disc 129 to the closed position closing dashpot passage 141.

Further, regulator 110 distinguishes from regulator 10 in being provided with a small discharge port 168 in the lower portion of dashpot housing wall 163. The lower end of the dashpot plunger 122 is provided with a radially outwardly opening annular groove 169 in which is received a sealing O-ring 170. Thus, control of the movement of dashpot plunger 122 is effected by the permissible flow through port 168 rather than the clearance between the dashpot plunger and the dashpot housing wall 163. Other than for these differences in structure, flow regulator 110 is similar to and functions similarly to flow regulator 10. All elements of regulator 110 similar to elements of regulator 10 are identified by similar reference numerals except 100 higher.

The difference in the functioning of the flow regulator 110 from the similar structure without the biasing spring 166 and the modified fluid port means 168 is illustrated in FIG. 17 wherein the pressure condition curve is shown for the unmodified regulator and in FIG. 18 for the regulator 110. As can be seen, a substantially improved damping and smooth transition operation is obtained by the provision of the biasing spring 166 and flow control port 168, providing further improved operation of the flow regulator.

The foregoing disclosure of specific embodiments is illustrative of the broad inventive concepts comprehended by the invention.

I claim:

1. In a flow regulator having a cylinder defining an inlet and an outlet, and means for regulating fluid flow through the cylinder from said inlet to said outlet including a biased piston having an end portion defining a radial, planar end surface adjacent said inlet movably received in the cylinder and variable flow passage means controlled by said piston for controlling flow of said fluid to said outlet, the improvement comprising:

means defining a central sensing orifice in said piston end surface for causing positioning of the piston in the cylinder as a function of a fluid pressure drop across said sensing orifice, said end surface defining an annular outer portion about said sensing orifice; and a stabilizer element extending across said inlet in spaced relationship to said piston end portion and provided with a plurality of distributed openings laterally outwardly offset from said sensing orifice and aligned with said annular outer portion to define with said annular outer portion flow diverting means causing turbulent radially and angularly inward flow of the fluid over said annular outer portion to the sensing orifice thereby permitting said sensing orifice to function as a knife edge fluid flow control means.

2. The flow regulator of claim 1 wherein said stabilizer element further defines stop means for limiting the movement of the piston toward said inlet.

3. The flow regulator of claim 1 wherein said stabilizer element comprises a perforate disc.

4. The flow regulator of claim 1 wherein said stabilizer element comprises a perforate disc having an annular turned flange defining stop means for limiting the movement of the piston toward said inlet.

5. The flow regulator of claim 1 wherein said sensing orifice is disposed at the center of said end surface and the radially inner portion of said stabilizer element openings overlies the periphery of said orifice.

6. The flow regulator of claim 1 wherein means are provided for removably securing said stabilizing element to said cylinder.

7. The flow regulator of claim 1 wherein said stabilizer element comprises means for selectively controlling the flow rate of the regulator.

8. In a flow regulator having a cylinder defining an inlet and an outlet port, and means for regulating fluid flow inwardly through said inlet and outwardly therefrom through said cylinder to said outlet port including a biased piston having an outer end portion adjacent said inlet movably received in the cylinder, an inner end portion, and a flow passage in said piston adjustably positioned by movement of said piston in adjustable alignment with said outlet port for controlling flow of said fluid to said outlet port, the improvement comprising:

means defining a sensing orifice in said piston outer end portion for causing positioning of the piston in the cylinder as a function of a fluid pressure drop across said sensing orifice;

means defining a closed chamber at the inner end of the cylinder for selectively receiving the inner end of the piston; and a plurality of radial ports in said inner end portion of the piston communicating with said flow passage and opening to a portion of said cylinder intermediate said cylinder outlet port and closed chamber for maintaining the fluid pressure between said piston inner end portion and said cylinder portion adjacent said outlet port substantially at the pressure of the fluid inwardly adjacent said sensing orifice.

9. The flow regulator of claim 8 wherein check valve means are provided on said piston and said radial ports extend successively through said inner end of the piston and said check valve means.

10. The flow regulator of claim 8 wherein means are provided for maintaining said piston flow passage and cylinder outlet port at least partially aligned at all times.

11. The flow regulator of claim 8 wherein said radial ports are disposed closely adjacent said piston flow passage.

* * * * *